No. 817,448. PATENTED APR. 10, 1906.
E. J. SHANAHAN.
POULTRY APPLIANCE.
APPLICATION FILED JULY 7, 1905.
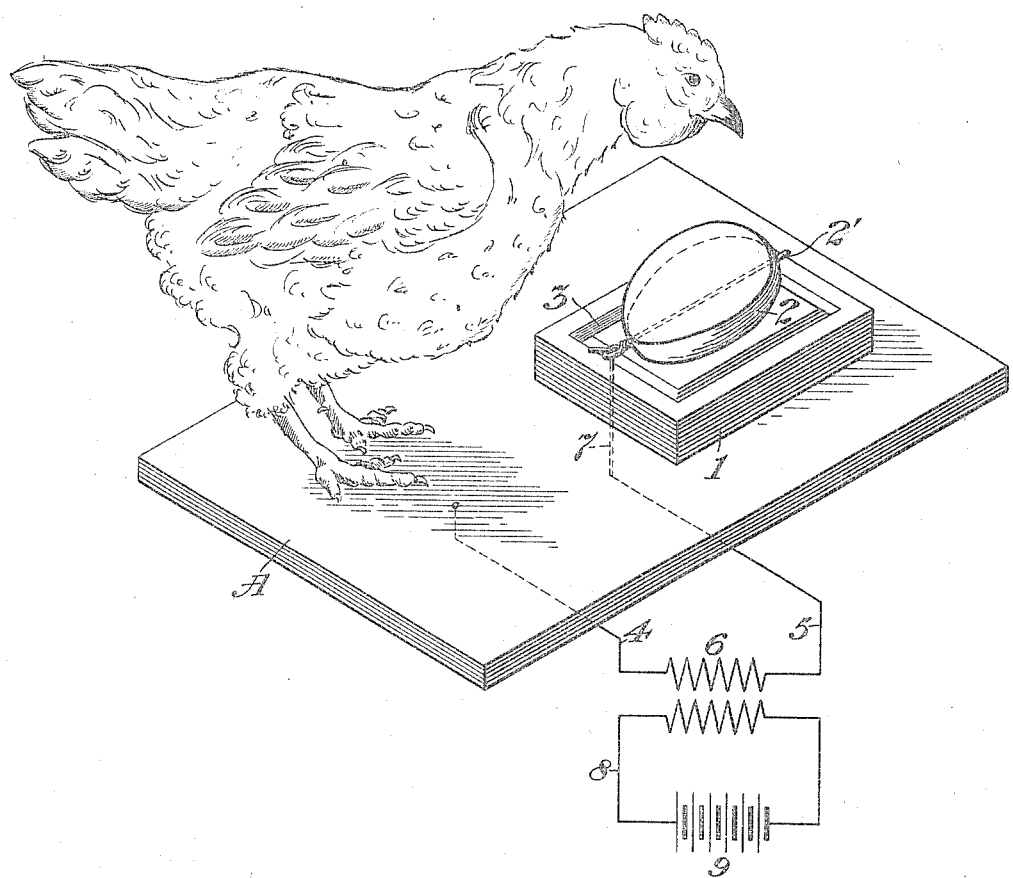
WITNESSES:
INVENTOR.
E. J. Shanahan
BY
Warfield & Duell
ATTORNEYS

UNITED STATES PATENT OFFICE.

EDWARD J. SHANAHAN, OF TRIBES HILL, NEW YORK.

POULTRY APPLIANCE.

No. 817,448.  Specification of Letters Patent.  Patented April 10, 1906.

Application filed July 7, 1905. Serial No. 268,703.

*To all whom it may concern:*

Be it known that I, EDWARD J. SHANAHAN, residing at Tribes Hill, in the county of Montgomery and State of New York, have invented certain new and useful Improvements in Poultry Appliances, of which the following is a full, clear, and exact description, such as will enable others skilled in the art to which it appertains to make and use the same.

This invention relates to poultry appliances, and is especially adapted for use in connection with domestic fowls, particularly hens. One of its objects is to provide a device designed to break up or reduce to a minimum the practice of egg-picking prevalent among domestic fowls.

A further object is the provision of a device of this character so constructed as to be arranged within a nest.

Other objects will be in part obvious and in part pointed out hereinafter.

The invention accordingly consists in the features of construction, combinations of elements, and arrangement of parts which will be exemplified in the device hereinafter described and the scope of the application of which will be indicated in the following claims.

In the accompanying drawing, wherein is illustrated one of the several various possible embodiments of my invention, the figure is a view in perspective of the same, showing a hen about to eat an egg, and thereby to put the device into operation.

Preliminary to a specific description of the several features of my invention it may here be noted that a great source of loss and annoyance to keepers of poultry resides in the vicious practice of certain fowls, particularly hens, of breaking the shells of eggs and eating the contents thereof before they have been removed from the nest. As tending to eliminate this practice I have found it desirable to provide a device such that an induced current of electricity will pass through the body of the hen or other fowl when egg-eating is attempted.

As the acts of egg-eating are usually performed within the nest, I have found it desirable to so construct the device designed to accomplish this purpose that the same may be arranged to operate within said nest. The above and other objects are attained in constructions of the nature of that hereinafter described Referring now to the drawings, there is shown at A a metallic base-plate, upon which is mounted an insulating-block 1. I prefer to construct the block of wood; but it is obvious that any suitable non-conducting substance may be advantageously employed in this relation. Mounted upon block 1 is a metallic substantially egg-shaped shell 2, designed to form a receptacle for an egg. A removable pin 2' is arranged longitudinally of said shell and extends without the ends thereof. Arranged about the edge of block 1 is a groove 3, the purpose of which will be apparent hereinafter. Leads 4 and 5 connect base-plate A and pin 2', respectively, with the opposite poles of induction-coil 6. Lead 5 is insulated from base-plate A, as at 7. A circuit 8, leading from a suitable source of supply, as, in the present instance, battery 9, is adapted to energize induction-coil 6 and to cause an induced current of electricity to flow through leads 4 and 5 when the circuit partly comprised thereby is closed.

Although from the above description the operation of my invention should be largely obvious, it is substantially as follows: The device as a whole is preferably arranged within a nest with base-plate A only scantily covered with straw or other material commonly employed in nests, which material is arranged about block 1 and partly covers shell 2. The connections having been arranged as shown, an egg is placed in shell 2 and pin 2' inserted therethrough. When a hen or other fowl standing upon base-plate A, as shown in the figure, breaks the egg in the shell 2 and attempts to eat the same, the contents thereof will flow about the sides of metallic shell 2 and wet the same, and the circuit partially comprised by leads 4 and 5 will be closed through the body of such fowl, causing, of course, physical pain and shock. At this point it may be noted that a direct connection at all times exists between the interior of the egg and the metallic shell 2, and it is only necessary that the hen or other fowl bring its bill into contact with the contents of the egg to set my device into operation.

It will readily be seen that a hen or other fowl once having attempted this practice and having been subjected to an electric current will thereafter from fear desist from such acts. Groove or trough 3 operates to prevent the contents of the egg from flowing down on base-plate A, and thus close the circuit, as will be readily understood.

Although I have shown and described my invention as applied to a device of the above character, I do not wish to be understood as being limited exclusively to this precise arrangement, as several of the features of my invention may be readily applied to devices of an analogous nature.

As many changes could be made in the above construction and many apparently widely-different embodiments of my invention could be made without departing from the scope thereof, I intend that all matter contained in the above description or shown in the accompanying drawing shall be interpreted as illustrative and not in a limiting sense.

I desire it also to be understood that the language used in the following claims is intended to cover all of the generic and specific features of the invention herein described and all statements of the scope of the invention which as a matter of language might be said to fall therebetween.

Having described my invention, what I claim as new, and desire to secure by Letters Patent, is—

1. In a device of the class described, in combination, a plate of conducting material, means adapted to receive an egg insulated from said plate, a source of electric supply, and leads extending from said source of supply to said plate and also to said egg-receiving means.

2. In a device of the class described, in combination, a plate of conducting material, means adapted to support an egg arranged upon said plate and insulated therefrom, a source of electric supply, and leads extending from said source of supply to said plate and also to said egg-supporting means.

3. In a device of the class described, in combination, a plate of conducting material, a device adapted to receive an egg, a source of electric supply, leads extending therefrom to said plate and also to said egg - receiving means, the arrangement being such that a circuit will be closed through the body of a fowl when standing upon said base-plate and engaged in eating said egg.

4. In a device of the class described, in combination, a plate of conducting material, a metallic egg-receiving shell insulated from said plate, a source of electric supply, leads extending therefrom to said plate and also to said egg-supporting shell, the arrangement being such that a circuit will be closed through the body of a fowl when standing on said plate and engaged in eating said egg.

5. In a device of the class described, in combination, a plate of conducting material, a block of non-conducting material arranged thereon, a metallic egg-receiving receptacle positioned upon said block, a source of electric supply, leads extending from opposite poles thereof to said plate and to said receptacle respectively, the arrangement being such that a circuit will be closed through the body of a fowl when standing upon said base-plate and attempting to eat an egg in said receptacle.

6. In a device of the class described, in combination, a plate of conducting material, a device adapted to receive an egg, means carried by said device adapted to enter the interior of an egg supported therein, a source of electric supply, leads extending from opposite poles thereof to said plate and also to said last-mentioned means, the arrangement being such that a current of induced electricity will flow through the body of a fowl standing upon said plate and attempting to eat an egg supported in said device.

7. In a device of the class described, in combination, a plate of conducting material, a block of non-conducting material arranged thereon, a device adapted to receive an egg positioned upon said block, means adapted to extend through said shell and also through an egg contained therein, a source of electric supply, leads extending from opposite poles thereof to said plate and also to the means extending within the egg supported in said egg-receiving device, the arrangement being such that a current of electricity will flow through the body of a fowl standing on said plate and engaged in eating an egg in said device.

8. In a device of the class described, in combination, a plate of conducting material, a block of non-conducting material supported thereon, a metallic shell carried by said block said shell being adapted to receive an egg therein, a source of electric supply, a connection between said plate and one pole of said source of supply, a connection between the opposite pole thereof and said metallic receptacle, the whole being so arranged and constructed as to cause a circuit to be closed through the body of a fowl while standing upon said base-plate and engaged in eating an egg in said metallic receptacle.

9. In a device of the class described, in combination, a source of electric supply, an electrode connected therewith, and a second electrode also connected therewith and comprised by a metallic receptacle adapted to receive an egg, said electrodes being so arranged that a circuit will be closed through the body of a fowl standing upon said first-mentioned electrode and attempting to eat the contents of an egg in said second-mentioned electrode.

10. In a device of the class described, in combination, an electrode adapted to be arranged within a nest, a second electrode comprised by a metallic egg-receiving receptacle also adapted to be arranged within said nest, an insulating - body arranged between said electrodes, leads extending from opposite poles of said source of supply to said electrodes, the arrangement being such that a circuit will be closed through the body of a fowl standing upon the first-mentioned electrode and attempting to eat an egg in said second-mentioned electrode.

11. In a device of the class described, in combination, a metallic base-plate, a block of conducting material provided with a surrounding recess in its upper surface supported by said base-plate, an egg-receiving receptacle arranged upon said block, a source of electric supply, said base-plate and said egg-receiving receptacle being connected to opposite poles of said source of supply, the arrangement being such that an induced current of electricity will flow through the body of a fowl standing upon said base-plate and attempting to eat an egg in said egg-receiving receptacle.

12. In a device of the class described, in combination, a metallic base-plate, a block of non-conducting material provided with a surrounding groove in its upper surface, an egg-receiving receptacle arranged upon said block, means carried by said receptacle adapted to extend within an egg contained therein, a source of electric supply, said base-plate and said last-mentioned means being connected respectively to opposite poles of said source of supply, the arrangement being such that a fowl standing upon said baseplate and attempting to eat an egg in said receptacle will close an electric circuit.

13. In a device of the class described, in combination, a metallic plate connected with one pole of a source of electric supply, a metallic shell adapted to receive an egg connected to the opposite pole of said source of supply, said plate and said egg-receptacle being adapted to be arranged within a nest.

14. In a device of the class described, in combination, a metallic plate connected with one pole of a source of electric supply, a block of insulating material arranged thereon, a metallic substantially egg-shaped receptacle positioned upon said block, said receptacle being adapted to receive an egg therein, said plate being adapted to be inserted within a nest.

15. In a device of the class described, in combination, a metallic plate connected to one pole of a source of electric supply, a block of insulating material having a groove in its upper surface, a metallic substantially egg-shaped shell supported by said block within said surrounding groove, said shell being connected to the opposite pole of said source of supply, the arrangement being such that a circuit will be closed through the body of a fowl standing upon said plate and attempting to eat the contents of an egg contained within said shell 16. In a device of the class described, in combination, a plate of conducting material connected with one pole of a source of electric supply, a block of insulating material arranged thereon, said block being provided with a recess extending entirely about the upper surface thereof, a metallic egg-receiving shell arranged upon said block within the inclosure outlined by said recess, a pin carried by said shell and adapted to extend therethrough and also through an egg contained therein, said pin being connected to the opposite pole of said source of supply, said plate and the devices supported thereon being adapted to be positioned within a nest.

In testimony whereof I affix my signature in the presence of two witnesses.

EDWARD J. SHANAHAN.

Witnesses:
G. WARREN HEATH,
JAMES W. FERGUSON.